Feb. 14, 1956  E. P. COOK  2,734,429
DEWATERING APPARATUS
Filed July 15, 1954  3 Sheets-Sheet 2

INVENTOR.
ERNEST P. COOK, deceased
by FERN BOUDINOT COOK,
BY                  Executrix
        RW Furlong
              ATTORNEY Feb. 14, 1956     E. P. COOK     2,734,429
DEWATERING APPARATUS Filed July 15, 1954     3 Sheets-Sheet 3

INVENTOR.
ERNEST P. COOK, deceased
by FERN BOUDINOT COOK,
BY     Executrix
ATTORNEY

United States Patent Office 2,734,429
Patented Feb. 14, 1956

2,734,429

DEWATERING APPARATUS

Ernest P. Cook, deceased, late of Berlin, N. H., by Fern Boudinot Cook, executrix, Berlin, N. H., assignor to Brown Company, Berlin, N. H., a corporation of Maine Application July 15, 1954, Serial No. 443,567

9 Claims. (Cl. 92—43)

This invention relates to an apparatus for separating from a slurry both the solid and liquid components thereof and pertains more specifically to a sheet former for dewatering and sheeting out pulp suspensions.

The device of the present invention is particularly applicable to the formation of a sheet of cellulose or cellulose derivative pulp or fiber from an aqueous slurry or suspension thereof and makes possible the production of a sheet of paper, board, or the like of extremely uniform thickness and density throughout its extent.

It has hitherto been proposed to provide a rotary strainer or filter which is mounted for rotation while immersed in a slurry together with means for withdrawing the liquid filtrate from within the strainer or filter and means for removing the accumulated solid material from the face of the strainer or filter. One of the chief difficulties with the devices of this type which have hitherto been known is that it has been difficult or impossible to obtain a sheet of solid material of uniform thickness and density along the length of the strainer or filter. Variation in the depth of the liquid filtrate within the strainer as the filtrate passes toward the outlet has caused variation in the hydrostatic head between the level of the slurry outside the strainer or filter and the level of the filtrate within the strainer, resulting in non-uniform rates of deposition of solid material along the length of the filter or strainer. Furthermore, in the devices hitherto known there has been some intermingling of the filtrate with slurry adjacent the ends of the filter member, causing both loss of some solid material from the slurry into the filtrate and dilution of the slurry adjacent the ends of the filter so that the thickness of the sheet of solid material deposited upon the filter has tended to be less at its margins than at its center. These problems become increasingly serious as the thickness of the pulp or paper sheet increases. Such heavy gauge pulp sheets (of the order of 1/16 inch or more in thickness) constitute one form in which cellulose fiber is supplied for conversion into viscose; variation in thickness or density of such a sheet leads to uneven absorption of caustic in the soaking step and hence to variation in quality of the viscose produced.

One object of the present invention is to provide a cylindrical strainer or filter adapted to produce a sheet of solid material of uniform thickness throughout its extent.

Another object is to provide apparatus capable of producing a heavy gauge cellulose fiber sheet of uniform density and thickness for use in the manufacture of high quality viscose.

Another object is to provide a sheet former having a rotary cylindrical strainer or screen and an internal weir member arranged to provide a uniform hydrostatic head or pressure drop through the cylindrical strainer throughout its length.

A further object is to provide apparatus of the type described including means for maintaining a supply of pulp suspension of substantially uniform density throughout its extent.

Still another object is to provide means for sealing the filtrate outlet of the strainer from the slurry or pulp suspension in which the strainer is immersed.

Other and further objects will be apparent from the drawings and from the description which follows.

The nature of the present invention will be clearly apparent by reference to the following description which relates to the accompanying drawings, in which.

Figure 1:
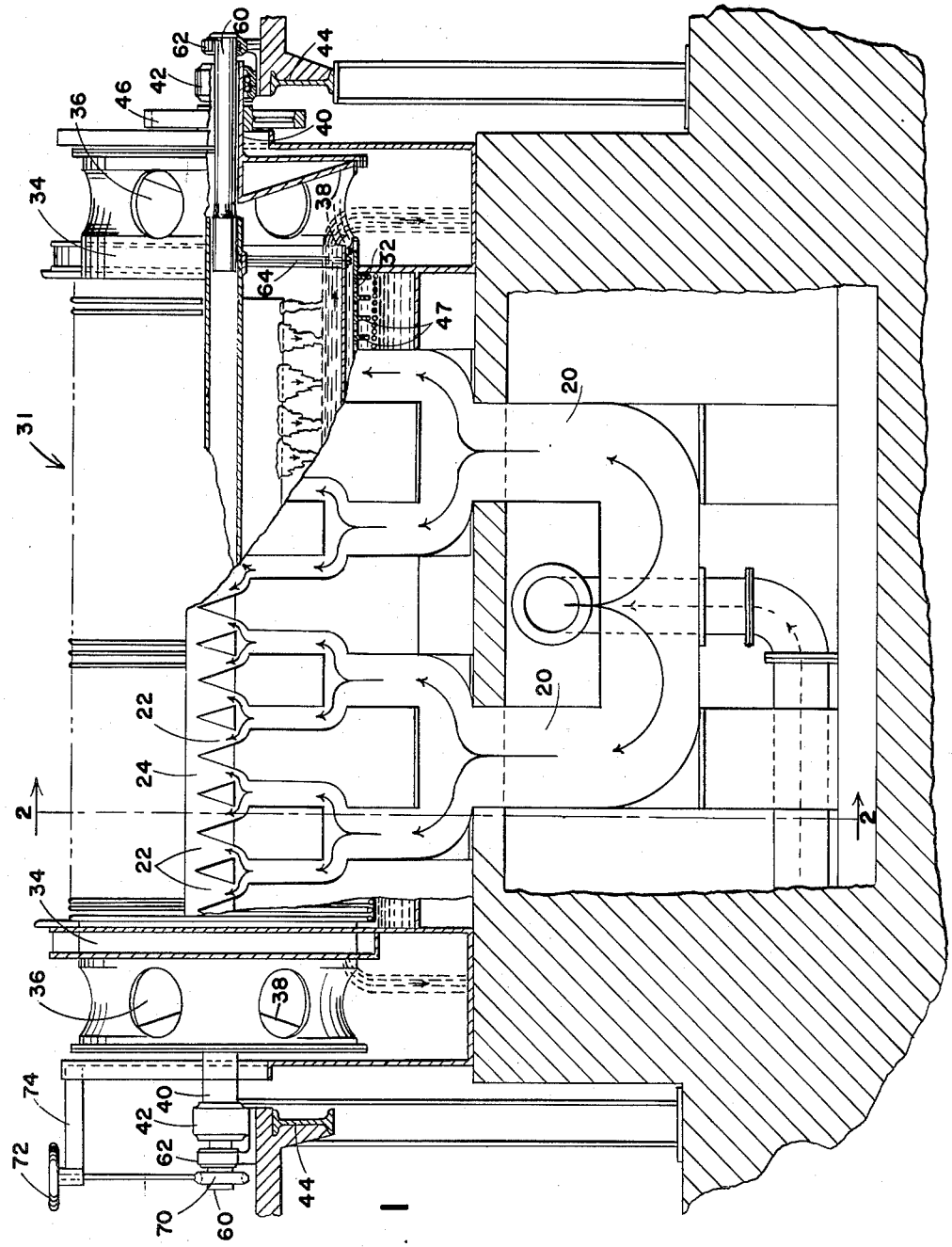
Fig. 1 is a view in longitudinal elevation, partly broken away and in section, showing one embodiment of the invention.
Figure 2:
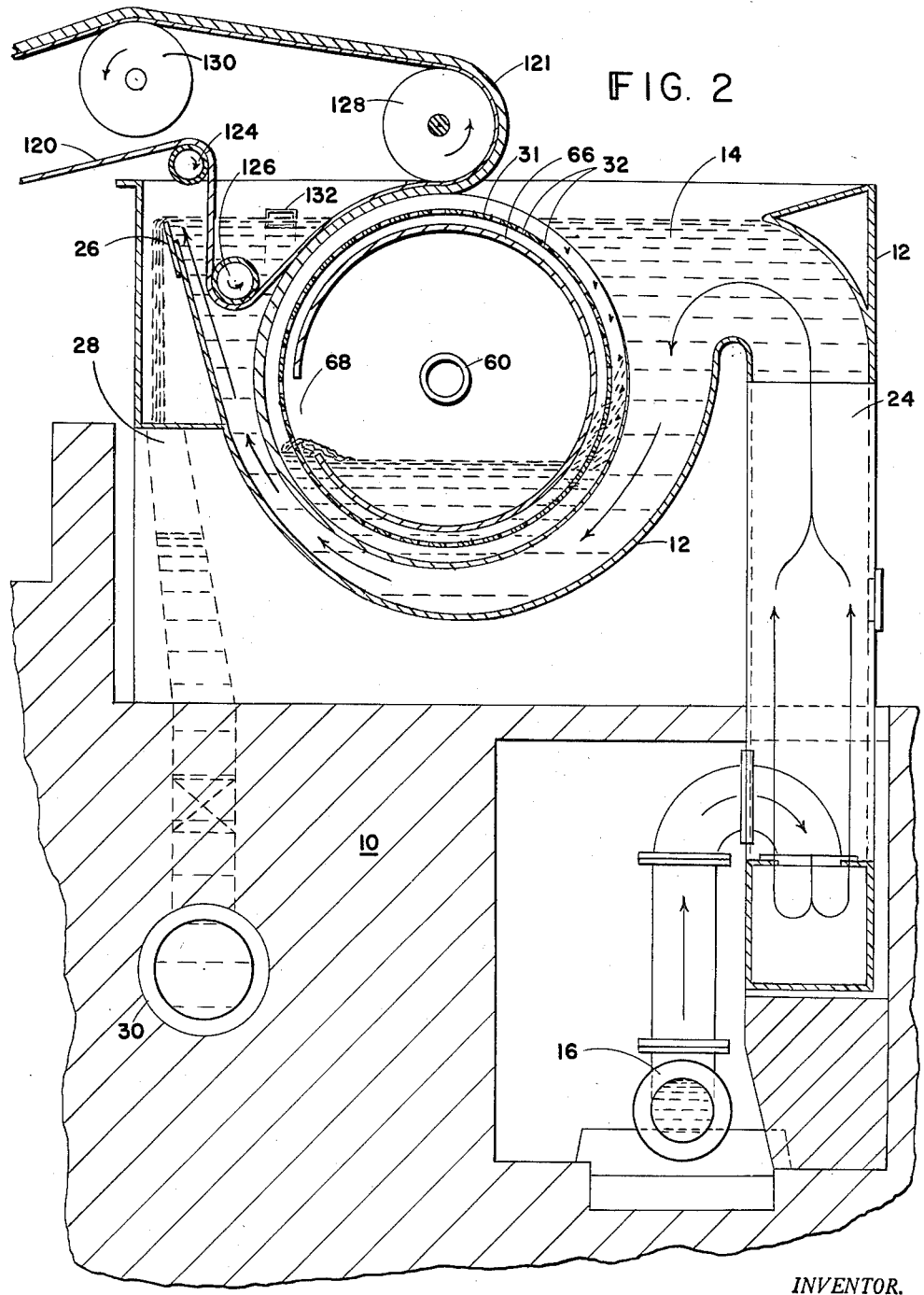
Fig. 2 is a vertical cross-sectional view taken along the line 2—2 of Fig. 1.

As shown in Figs. 1 and 2, the device includes a base 10 upon which is mounted a receptacle or trough 12 adapted to contain the slurry 14 which is to be separated into its solid and liquid components.

A continuous supply of the slurry which may, for example, be a suspension of cellulose pulp or fibers in water, aqueous caustic solution, etc. is provided through supply conduit 16, the supply being distributed uniformly along the length of receptacle 12 by means of header 18 and distributor pipes 20, 20 which in turn subdivide repeatedly, as best shown in Fig. 1, to provide a plurality of streams of slurry through the apertures 22, 22 in distributor member 24 which extends along the length of one side of receptacle 12. At the opposite side of receptacle 12 is provided an adjustable weir 26 which maintains slurry 14 at a constant level, excess slurry passing over weir 26 to outlet conduits 28, 30 whence it may be recirculated through receptacle 12 if desired. It will be understood that any other conventional means for maintaining a constant level of slurry within receptacle 12 may be provided if desired.

Mounted for rotation within trough 12 is a generally horizontal, cylindrical filter member designated generally by 31, the filter member being supported at each end by means of flanges 38, 38 which are mounted upon the inner ends of hollow stub shafts 40, 40 journaled in bearings 42, 42 which are supported upon suitable supporting members 44, 44. Pulley wheel 46 is keyed to shaft 40 at one end of filter member 31 so that the filter member may be rotated from any suitable power source (not shown) by means of a conventional belt or pulley drive. The midportion of filter member 31 is provided with a plurality of relatively small perforations 32, 32 while each end portion is provided with large outlet openings 36, 36.

Figure 4:
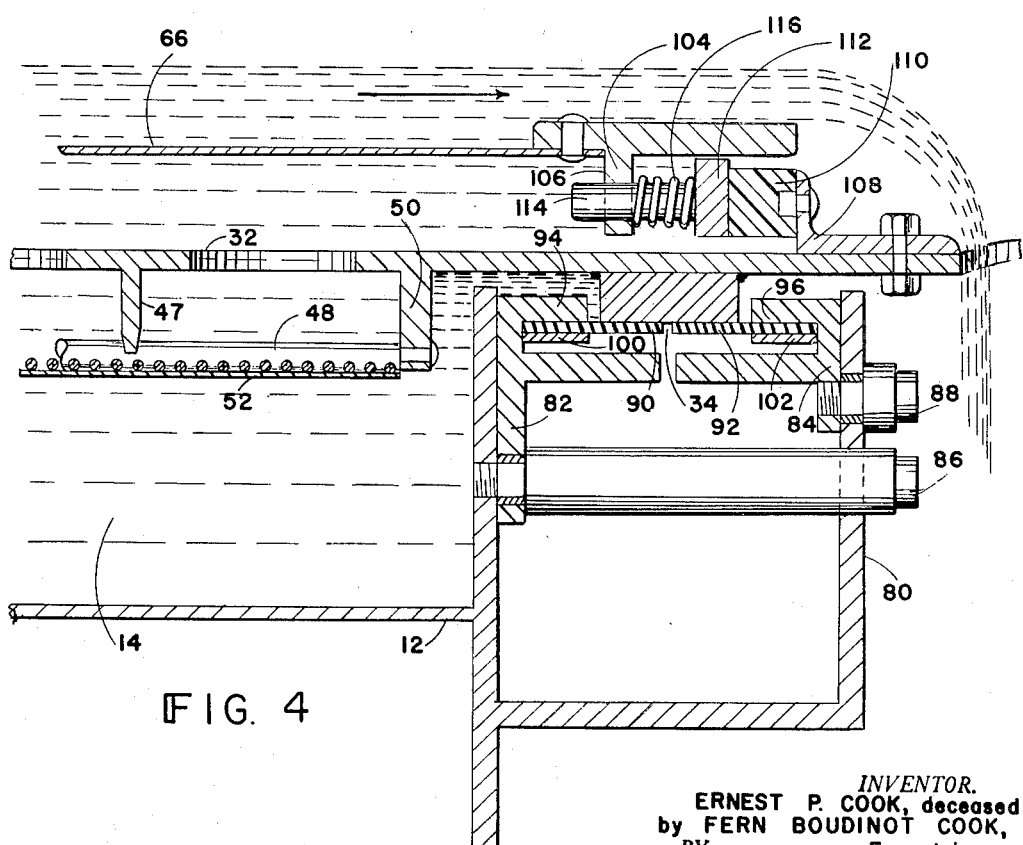
Fig. 4 is a detailed longitudinal section showing the sealing means for sealing an end of the filter adjacent the filtrate outlet.

As best shown in Fig. 4, the midportion of cylindrical filter member 31, in addition to having perforations 32 in its face, is provided with outwardly extending peripheral ribs 47, 47 which serve to support a grid of spaced reinforcing bars 48 which extend longitudinally of filter member 31, being secured at their ends to flange 50.

Disposed over reinforcing bars 48 is any suitable strainer or filter material such as screen wire 52 which is of such construction that it will permit the passage of liquid therethrough while retaining on its face the solid material present in the slurry 14.

Extending coaxially through the center of hollow shafts 40, 40 is a second shaft 60 journaled in bearings 62, 62 mounted beyond the ends of shafts 40, 40. Secured to shaft 60 within filter member 31 adjacent each end of the perforated midportion thereof are spiders 64, 64 to which is secured a generally cylindrical hollow weir member 66 which is imperforate except for an aperture or slot 68 which extends longitudinally throughout the length of weir member 66. A suitable worm gear drive 70 operated by means of hand wheel 72 mounted on framework 74 may be provided adjacent one end of shaft 60 for adjustably rotating the shaft along with the spiders 64 and weir member 66. Rotation of shaft 60 is independent of the rotation of filter member 31 so that weir member 66 may be adjusted to any desired position of rotation to maintain slot 68 at any desired level with respect to the level of slurry 14.

Adjacent each end of filter member 31 there is secured an annular sealing member 34, as best shown in Fig. 4, which rotates with filter member 31. Encompassing sealing member 34 is an annular chamber 80 which is secured to trough 12 at either end thereof. A pair of flange members 82, 84 are secured at opposite sides of chamber 80 adjacent its inner margin by means of clamping bolts 86, 88. A pair of sealing gaskets 90, 92 which may be of rubber or similar flexible resilient material are clamped to the faces of inwardly extending flanges 94, 96 by means of metallic clamping rings 100, 102 with the margins of gaskets 90, 92 overlying sealing member 34 in sliding contact therewith. Chamber 80 may be filled with liquid such as water to approximately the same level as the level of the slurry in trough 12, the liquid level in chamber 80 preferably being somewhat higher than that of the slurry. Accordingly, the hydrostatic pressure at any given point within the chamber 80 will be approximately equal to or preferably greater than the hydrostatic pressure of the slurry immediately adjacent so that gaskets 90, 92 will be pressed against sealing member 34 to prevent or minimize any leakage of slurry past sealing member 34 into the outlet.

In order to seal the space between the perforated face portion of filter member 31 and internal weir member 66, a flange member 104 is secured to each end of weir member 66, flange member 104 having a radially outwardly extending fin 106. A second flange member 108 is secured to the marginal portion of filter member 31 with its face in opposing spaced relation to fin 106. Secured to the face of flange member 108 is a sealing ring 110 of hard rubber, phenolic resin, or other similar material, against the face of which bears a sealing member 112 mounted upon a plurality of pins 114 which are slidably engaged in mating apertures in fin 106. Compression springs 116 are mounted on pins 114 between fin 106 and sealing ring 112 and serve to thrust sealing ring 112 against the opposing face of sealing member 110 to provide a face-to-face seal. Although there is a slight clearance between the inner margin of ring 112 and the outer face of flange member 104, this clearance may be made very small since ring 112 rotates with flange member 104. This construction provides a sufficiently tight seal to accomplish the purposes of the present invention.

In order to remove the accumulated solid material or pulp sheet 121 which builds up on the face of filter member 31 as it rotates in the slurry, felt 120 is trained over idler roll 124, felt roll 126, and couch roll 128, thence over driving roll 130, the reach between felt roll 126 and couch roll 128 bearing against the face of filter member 31.

Figure 3:
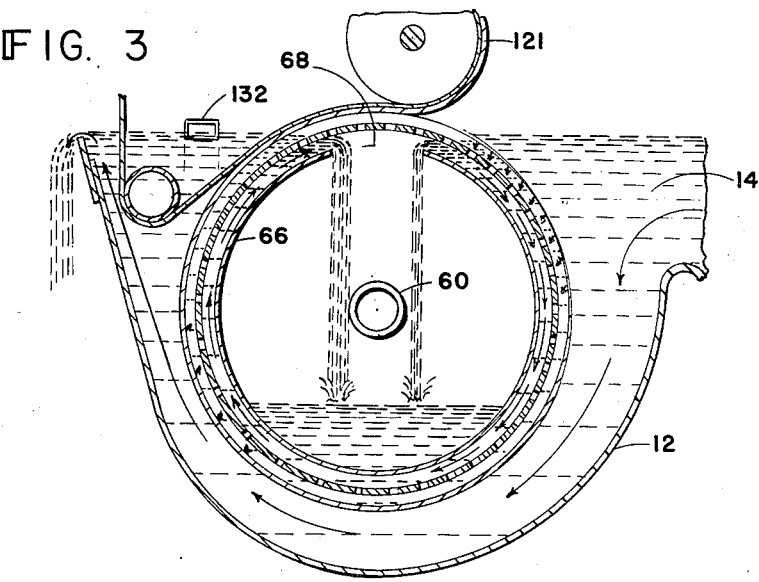
Fig. 3 is a view similar to Fig. 2 showing the internal weir member in position for starting or stopping operation of the device.

Since some water passes through felt 120 as it is pressed against pulp sheet 121, the pulp suspension in the space above felt roll 126 (Figs. 2 and 3) tends to become diluted, and the dilute suspension tends to flow around the edges of felt 120 and cause the marginal portions of sheet 121 to be thinner and less dense than the central portion. In order to eliminate this difficulty, each end wall of trough 12 is provided with an aperture 132 in the zone above felt roll 126 to permit the diluted suspension to flow to outlet conduits 28, 30 along with the overflow over weir 26. In operation of the device of the present invention, weir member 66 is first rotated by means of handwheel 72 so that aperture 68 is in the uppermost position, as shown in Fig. 3, and the flow of slurry 14 is started through trough 12, the flow being evenly distributed across the face of filter member 31 by means of apertures 22, 22 in distributor member 24. Rotation of filter member 31 is started, but since the pressure drop through filter member 31 is equal only to the difference between the level of slurry 14 in trough 12 and the level of aperture 68 in weir member 66, there is very little filtering or screening of the slurry, only a very thin layer of solid material accumulating on the face of filter member 31. As operation of the device continues, handwheel 72 is manipulated to rotate weir member 66 to the position shown in Fig. 2 where aperture 68 is located well below the level of slurry 14 in trough 12. Under these conditions, a relatively thick layer of solid material 121 accumulates on the face of filter member 31 as it rotates and is removed by means of felt 120.

Inasmuch as all of the liquid filtrate which passes through filter member 31 must pass over the lip of aperture 68 in weir member 66, the pressure drop or hydrostatic head through filter member 31 is uniform along its extent despite the fact that there is a considerable flow of the liquid filtrate from the midportion of filter member 31 toward the outlet openings 36 adjacent each end. The uniform pressure drop through filter member 31 thus provided along its length, together with uniform distribution of the slurry supplied through distributor member 24, provides a sheet or deposit 121 which is of very uniform thickness and density throughout its extent. Sealing member 34 together with sealing gaskets 90, 92 at each end of filter member 31 prevent loss of slurry 14 to the outlet and also prevent dilution of the slurry adjacent each end of trough 12 by backing up of filtrate from the outlet. Any slight flow of filtrate from the space between filter member 31 and weir member 66 which may occur is so insignificant that its has no measurable effect upon the pressure drop controlled by the position of aperture 68 in weir member 66.

Although specific embodiments of the invention have been herein described, it is not intended to limit the invention solely thereto, but to include all of the obvious variations and modifications within the spirit and scope of the appended claims.

I claim:

1. Apparatus for separating the solid and liquid components of a slurry comprising a receptacle for the slurry, a cylindrical strainer mounted within said receptacle for rotation about a generally horizontal axis while at least partially immersed in said slurry, a hollow generally cylindrical weir member having a longitudinal aperture in its wall, said weir member being mounted coaxially within said strainer and being adjustably rotatable about said axis independently of the rotation of said strainer, said aperture providing the sole outlet for liquid passing through said strainer, means for draining said liquid from within said weir member, means for rotating said strainer, and means for removing accumulated solid material from the face of said strainer.

2. A rotary device for removing solid material from a slurry containing suspended solids comprising a receptacle for containing the slurry, a cylindrical filter mounted in said receptacle for rotation about its axis while immersed in said slurry, weir means disposed within said cylindrical filter, said weir means being adjustable independently of the rotation of said filter to vary the pressure drop through said filter, means for rotating said filter, means for removing accumulated solid material from the face of said filter as it rotates, and means for withdrawing the filtrate from within said filter beyond said weir.

3. A sheet former for dewatering and sheeting out a pulp suspension which comprises a trough, a generally horizontal axially rotatable cylindrical filter mounted within said trough, means for rotating said filter, means for providing a supply of pulp suspension to said trough externally of said filter including distributor means for distributing said supply along the length of said filter, means for maintaining said pulp suspension at constant level within said trough, a generally cylindrical weir member mounted coaxially within said filter and having an aperture extending lengthwise thereof, said weir member being adjustably rotatable about its axis independently of the rotation of said filter to vary the drop between the external suspension level and said aperture, means for withdrawing the filtrate from an end of said weir member, and means for removing the pulp sheet from the face of the rotating filter.

4. A sheet former for dewatering and sheeting out a pulp suspension which comprises a trough, a generally horizontal cylindrical filter mounted for axial rotation in said trough, means for providing a continuous flow of pulp suspension to said trough including means for distributing said flow substantially uniformly along the length of said filter, means for rotating said filter, means for sealing the ends of said rotating filter to said trough, a weir member mounted on said trough to maintain said pulp suspension at constant level within said trough, a generally cylindrical hollow weir member disposed coaxially within said filter and having an axially extending slot in its periphery, means for adjustably rotating said hollow weir member independently of the rotation of said filter to vary the pressure drop between the level of the pulp suspension in said trough and the slot in said hollow weir member, means for continuously withdrawing the filtrate from an end of said hollow weir member, and means for continuously removing the pulp sheet from the face of said rotating filter.

5. A sheet former for dewatering and sheeting out a pulp suspension comprising a generally horizontal cylindrical screen mounted for rotation about its axis, means for rotating said screen, means for providing a supply of pulp suspension to the cylindrical face of said screen and for maintaining substantially constant the level of the pulp suspension in contact with the face of said screen, an axially slotted imperforate sleeve coaxially mounted within said screen, means for adjustably rotating said sleeve independently of the rotation of said screen to vary the hydrostatic head between the level of said pulp suspension and said slot uniformly along the length of the screen, outlet means for draining the filtrate from an end of said sleeve, and means for removing the pulp sheet from the face of the rotating screen.

6. A sheet former as defined in claim 5 in which annular sealing means is provided adjacent the outlet end of said filter to seal said pulp suspension from said outlet means.

7. A sheet former as defined in claim 6 in which said sealing means includes a cylindrical sealing face rotating with said filter, a fixed annular sealing gasket providing a sliding seal against said sealing face, and an annular chamber encompassing said sealing gasket substantially throughout its periphery, said chamber being adapted to be filled with liquid to approximately the level of said pulp suspension whereby the hydrostatic pressure of said liquid balances the pressure of said pulp suspension to press said gasket against said sealing face.

8. In a sheet former for dewatering and sheeting out a pulp suspension comprising a generally horizontal cylindrical filter rotating axially in a supply of said pulp suspension and outlet means adjacent an end of said filter for draining said filtrate from the interior of said filter, sealing means for sealing said pulp suspension from said outlet comprising a generally cylindrical sealing face adjacent the end of the filter and rotating therewith, a fixed sealing band engaging the periphery of said sealing face, and an annular chamber encompassing said sealing band adapted to be filled with liquid to approximately the level of said pulp suspension whereby the hydrostatic pressure of said liquid balances the pressure of said pulp suspension to urge said band against said sealing face.

9. A sheet former as defined in claim 5, in which said means for removing the pulp sheet comprises a reach of felt extending into said pulp suspension and pressing against said pulp sheet on said screen as said sheet emerges from said pulp suspension and in which means are provided for withdrawing diluted pulp suspension from the zone adjacent the free face of said felt.

References Cited in the file of this patent

UNITED STATES PATENTS

| 2,001,208 | Minskey et al. | May 14, 1935 |
| 2,329,553 | Newbould | Sept. 14, 1943 |

FOREIGN PATENTS

| 27,970 | Sweden | Oct. 19, 1907 |
| 301,888 | Germany | Nov. 9, 1917 |
| 528,352 | Germany | June 27, 1931 |